United States Patent [19]
Ranta et al.

[11] Patent Number: 5,694,022
[45] Date of Patent: Dec. 2, 1997

[54] VARIABLE PULSE RECHARGING BATTERY PACK

[75] Inventors: Craig S. Ranta, Redmond; David S. Nierescher, Newcastle; Steven M. Swedenburg, Seattle, all of Wash.

[73] Assignee: Selfcharge, Inc., Bellevue, Wash.

[21] Appl. No.: 574,602

[22] Filed: Dec. 18, 1995

[51] Int. Cl.[6] .................................................. H01M 10/46
[52] U.S. Cl. ........................................ 320/21; 320/49
[58] Field of Search .............................. 320/5, 20, 21, 320/23, 24, 30, 31, 44, 49

[56] References Cited

U.S. PATENT DOCUMENTS

| | | | |
|---|---|---|---|
| 3,471,771 | 10/1969 | Mortimer | 323/22 |
| 3,766,463 | 10/1973 | Ruben | 320/23 |
| 3,781,632 | 12/1973 | Charboneau | 320/39 |
| 3,876,921 | 4/1975 | Bigbee, III | 320/20 |
| 3,970,913 | 7/1976 | Heindl | 320/48 |
| 4,019,111 | 4/1977 | Bennefeld | 320/23 |
| 4,220,909 | 9/1980 | Piteo | 320/39 X |
| 4,321,523 | 3/1982 | Hammel | 320/14 |
| 4,622,507 | 11/1986 | Persen | 320/2 |
| 4,712,055 | 12/1987 | Houser, Jr. | 320/35 |
| 4,998,056 | 3/1991 | Cole | 320/35 |
| 5,182,510 | 1/1993 | Nakamura | 322/21 |
| 5,214,369 | 5/1993 | McCrea | 320/21 |
| 5,270,635 | 12/1993 | Hoffman et al. | 320/21 |

OTHER PUBLICATIONS

Tapavica, K., "Transistorized Battery Chargers", *Brown Boveri Review*, No. 12, Dec. 1978, pp. 832–835.

Graf, R.F., *The Modern Power Supply and Battery Charger Circuit Encyclopedia*, 1992, pp. 1–22.

*Primary Examiner*—Edward Tso
*Attorney, Agent, or Firm*—Christensen O'Connor Johnson & Kindness PLLC

[57] ABSTRACT

A battery pack for an electrical device contains rechargeable batteries for supplying power to the electrical device and a transformerless pulse charging circuit. The pulse charging circuit generates a pulse charging current from received AC current, and charges the rechargeable batteries with the generated pulse charging current. A semiconductor switch (12) generates the pulse charging current from the received AC current and supplies the pulse charging current to the batteries. A ramp generator circuit (14) generates a linearly rising waveform beginning at each zero crossing of the rectified AC current. A current sense amplifier circuit (15) measures the average value of current pulses through the battery and generates a signal proportional to an average charging current. A triggering circuit (18) generates the gate firing pulses for the semiconductor switch (12) according to the linearly rising waveform and the average charging current amplifier waveform.

27 Claims, 4 Drawing Sheets

VARIABLE PULSE RECHARGING BATTERY PACK

FIELD OF THE INVENTION

This invention relates to rechargeable battery packs for electrical devices and, more particularly, to battery packs with a rechargeable battery and a high performance pulse recharging circuit contained within.

BACKGROUND OF THE INVENTION

Many mobile electronic products include a rechargeable battery pack supplying electrical power. Generally, these battery packs include a recharging socket or stand for recharging drained battery packs. The stand connects to an AC source of electrical power, such as a standard, household electrical outlet, receiving AC current and transforms the AC current to a recharging current for the battery pack. When not in use, the battery pack is frequently stored in the stand, which continuously supplies electrical power to the battery pack, maintaining the battery pack in a fully charged condition for use when needed.

Recharging stands are generally bulky and inconvenient for light weight portability. If the electronic product is, for example, a mobile telephone, frequently, the telephone and battery pack are taken on trips, and the recharging stand is left behind. Inevitably, there is a time when the battery pack becomes depleted while on the trip, making the telephone unusable until an AC source is found for recharging the battery pack.

One attempted solution is the purchase of one or more additional battery packs for the telephone. Thus the user has more battery time. When a battery pack becomes depleted, another charged battery pack is ready. However, the user is still ultimately limited by the amount of phone time the extra batteries provide. No capabilities exist to travel with the phone and a single battery pack while maintaining virtually unlimited use of the rechargeable battery pack.

Some have tried to incorporate charging circuits with the battery, see Person, U.S. Pat. No. 4,622,509. Person has shown an effective combination for a C-size battery or larger. The technology is ineffective with the unique shape, weight and power requirements of recent electronic products. Over time, the size and weight of electronic products have decreased, requiring that the battery and battery pack be light and compact. For example, cellular phones are now about the size of one's hand and the battery pack, attachable to the back, is only large enough to house the batteries.

Many new products require NiCd or some other form of rechargeable batteries. In order to effectively charge NiCd batteries, a pulse must be applied to the battery at intervals. Transformer charging circuitry has been able to create this kind of pulse charging method. However, for example, a transformer and corresponding circuitry are too large for a cellular phone battery pack.

Hammel, U.S. Pat. No. 4,321,523, illustrates a transformerless pulse charging circuit available for charging NiCd batteries without a transformer. However, these types of circuits are unconcerned with the unique problems involved with inserting the battery and the recharging circuit into a single compact battery pack. Also, unique problems with the start up of SCR switches and the effective use of time and temperature control circuitry have fallen short of solving the unique problems involved with placing recharging circuitry and batteries within the small space of battery packs.

The present invention is directed to addressing the foregoing concerns by providing a battery pack that combines both rechargeable batteries and a fast pulse charging circuit.

SUMMARY OF THE INVENTION

In accordance with the present invention, a battery pack for an electrical device contains rechargeable batteries for supplying power to the electrical device and a transformerless pulse charging circuit for receiving an AC current from an external source, generating a pulse charging current from the received AC current, and pulse charging the battery with the generated pulse charging current.

In accordance with other aspects of the present invention, the rechargeable batteries are NiCd. Pulse charging is very effective for charging certain quality NiCd batteries, especially the quality of NiCd batteries used in portable electronic products. Also, pulse charging is effective for charging Nickel Metal Hydride (NiMH) batteries.

In accordance with other aspects of the present invention, the charging circuit comprises a rectifier circuit for fully rectifying the received AC current, a semiconductor switch coupled to the rectifier circuit for generating the pulse charging current from the received AC current and supplies the pulse charging current to the nickel cadmium battery, a ramp generator circuit for generating a linearly rising waveform beginning at each zero crossing of the rectified AC current, a current sense amplifier circuit for measuring the average value of current pulses through the nickel cadmium battery and generating a signal proportional to an average charging current, and a triggering circuit for generating the gate firing pulses for the semiconductor switch according to the linearly rising waveform and the average charging current amplifier waveform.

In accordance with another aspect of the present invention, a soft start circuit provides smooth start-up of the charging circuit. In essence, the circuit gradually increases the charging pulses until reaching the full charging rate.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
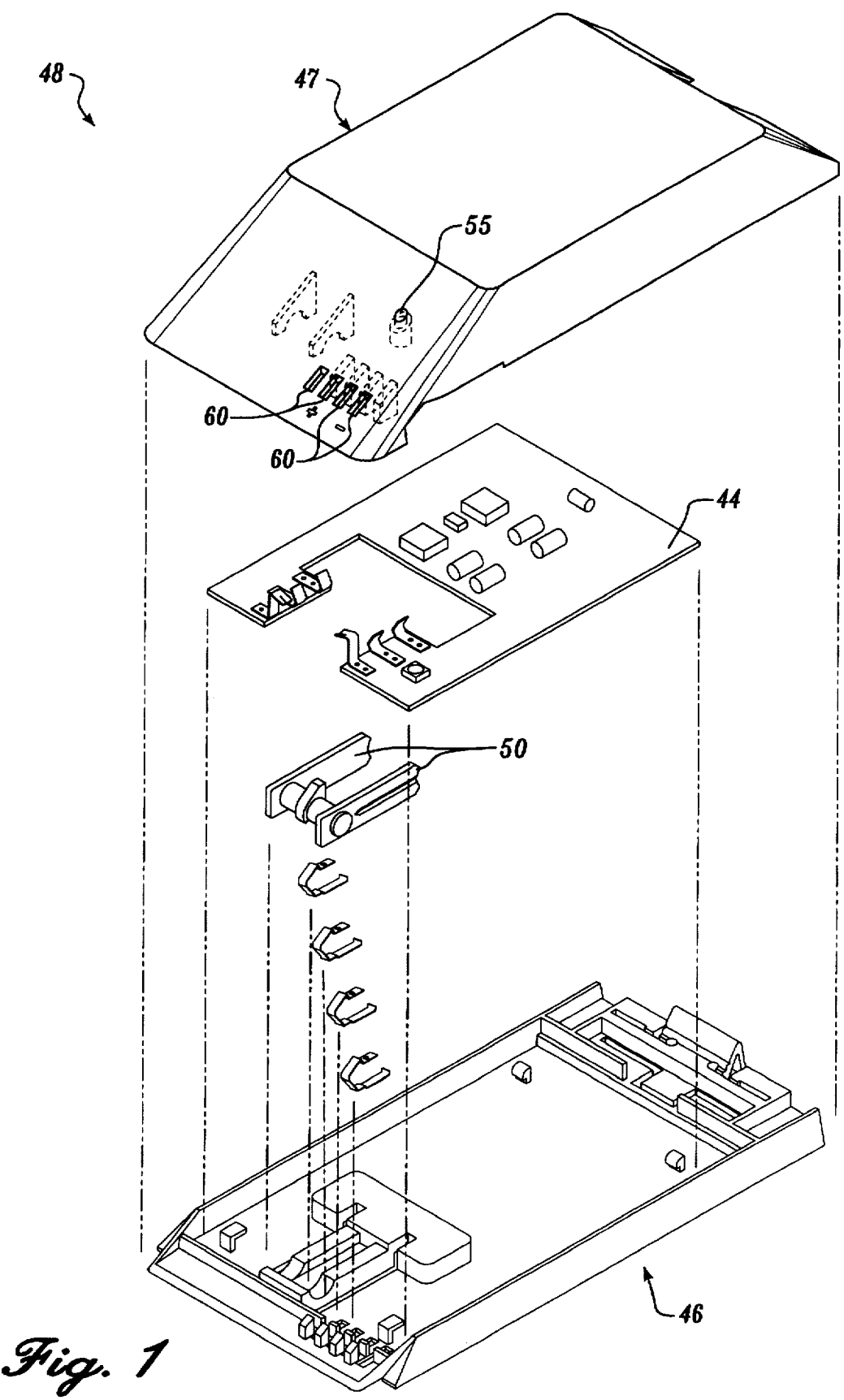
FIG. 1 is an exploded view of a cellular phone battery pack of the present invention.

FIG. 1 illustrates the present invention embodied as a cellular phone battery pack. The cellular phone battery pack 48 includes a front cover 47 and a back plate 46 that attaches to the back of a cellular phone. Plate 44 contains both a charging circuit and rechargeable batteries and is placed inside the battery pack 48. A plug 50, connected to an input point of the charging circuit, mounts flush with the exterior surface of the back plate 46 and is extendible to a position orthogonal with the exterior surface of the back plate 46 for inserting into an AC outlet during the active charging state. On the front cover 47, leads 60 connect to the batteries and to recharging circuits within common recharging stands. The charging circuit indicates charging state through port 55 located on the front cover 47 when charging from AC power.

Figure 2:
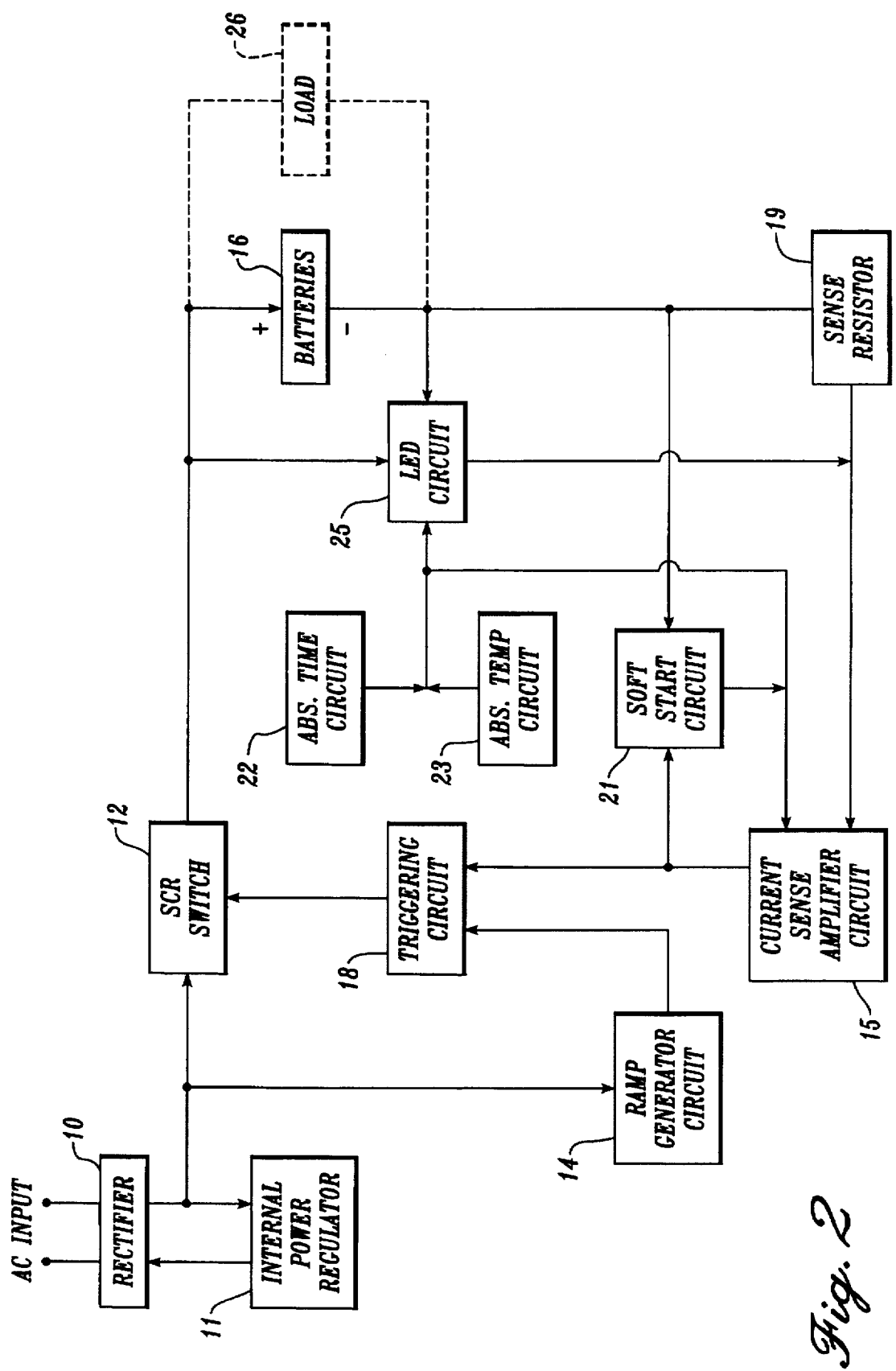
FIG. 2 is a block diagram of one embodiment of the present invention.

FIG. 2 illustrates one embodiment of the charging circuit within the battery pack 48. The charging circuit comprises a rectifier 10, an SCR switch 12, batteries 16, current sense amplifier circuit 15, ramp generator circuit 14, triggering circuit 18, timer circuit 22, temperature circuit 23, soft start circuit 21, internal power regulator 11, a sense resistor 19, and red and green LED circuit 25.

The rectifier circuit 10 converts the AC line input to a fully rectified periodic waveform. The SCR switch 12 is connected between the rectifier 10 and the battery 16, and admits current pulses to the battery as governed by the triggering circuit 18 through the control terminal of the SCR switch 12. The triggering circuit 18 generates gate firing pulses for the SCR switch 12 in accordance with the output of the ramp generator circuit 14 and current sense amplifier circuit 15. An internal power regulator 11 receives current from the output of the rectifier 10 and generates a voltage for powering the components of the circuit.

Figure 3:
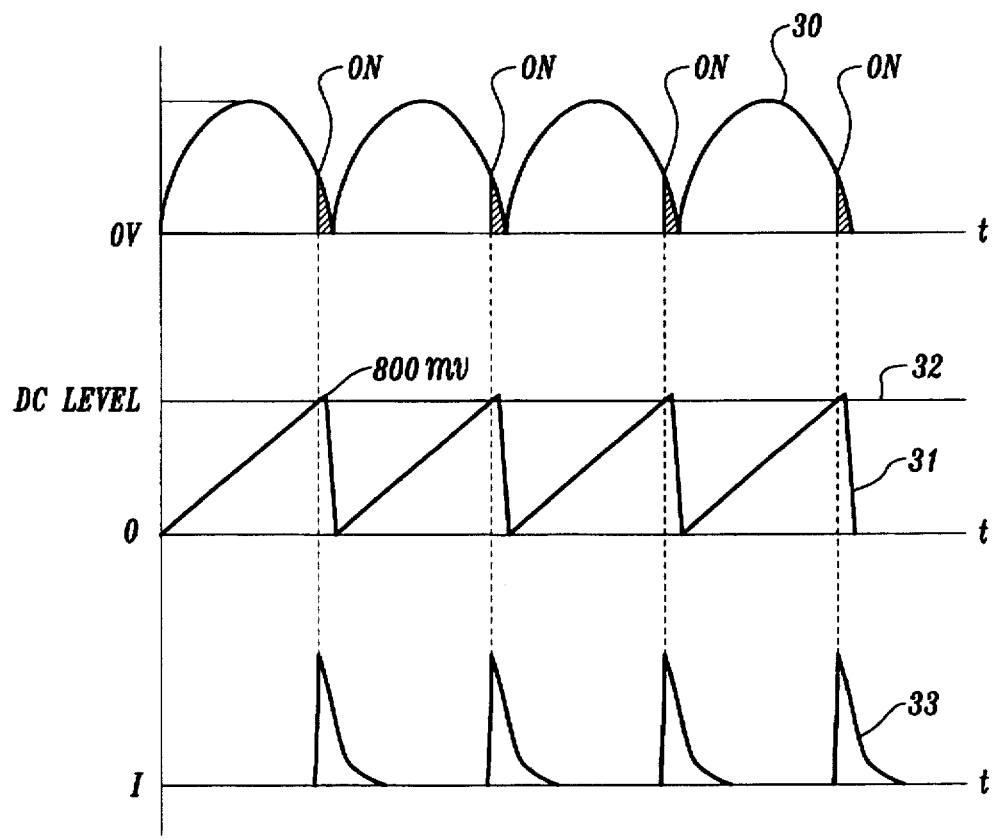
FIG. 3 is an illustration of some signals generated at various stages within the charging circuit.

The ramp generator circuit 14 generates a linearly rising waveform, ramp curve 31 with an amplitude of 800 mV, as shown in FIG. 3, from a scaled down output of the rectifier 10 and a reference voltage from the internal power regulator 11. The ramp generator circuit 14 outputs the ramp curve 31 to an input of the triggering circuit 18. The current sense amplifier circuit 15 senses the battery charging current as measured across a sense resistor 19, generates a DC level 32, as shown in FIG. 3, proportional to the sensed current, and outputs the DC level 31 to another input at the triggering circuit 18. If the current sense amplifier circuit 15 senses a low battery charging current, a low DC level is generated. If the current sense amplifier circuit 15 senses a high battery charging current, the DC level generated is high.

As shown in FIG. 3, the triggering circuit 18 compares the DC level 32 generated by the current sense amplifier circuit 15 and the ramp curve 31 generated by the ramp generator circuit 14 and generates a control pulse when the ramp curve 31 rises above the DC level 32. The generated control pulse drives the SCR switch 12, as shown in FIG. 3 on curve 30. The SCR switch 12 remains on until the voltage of the rectified curve 30 reaches zero. Closing the SCR switch 12 on the trailing edge of the rectified curve, as shown in FIG. 3, generates current spikes 33 for effectively charging the NiCd batteries used in the preferred embodiment of the present invention.

Figure 4:
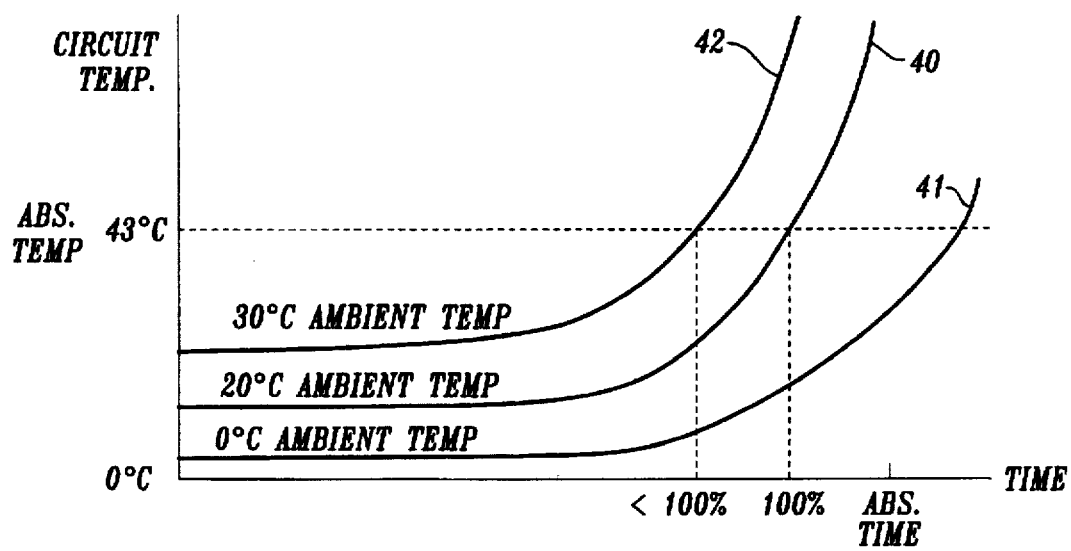
FIG. 4 is a temperature versus time illustration of the charging process.

The absolute time circuit 22 and the absolute temperature circuit 23 determine the battery charging limits. The absolute temperature circuit 23 is the primary source for determining when the batteries are done charging. As shown in FIG. 4, the absolute temperature cut off is approximately 43° C. for this invention. For the NiCd batteries used in this invention, 43° C. is the circuit temperature at which the batteries are 100% charged when the ambient air temperature is 20° C., as shown by curve 40. The circuit temperature in a high ambient temperature environment, curve 42, reaches the temperature cutoff before the battery is fully charged. A cutoff at 43° C. ensures the batteries don't break down due to overheating. However, in a cold environment, the battery charges well beyond 100% before ever reaching the absolute temperature cutoff. The absolute time circuit 22 ensures that the batteries do not charge too far beyond 100% by forcing the circuit to charge at a lower rate at a predetermined cutoff temperature. When the absolute time circuit 22 or the absolute temperature circuit 23 reach their respective limits, a current is sent to the current sense amplifier circuit 15. As a result, the current sense amplifier circuit 15 senses a higher charge, thinking the higher charge is coming off of the batteries, and outputs a higher DC level to the triggering circuit 18. As shown in FIG. 3, the higher the DC level 32 intersects the ramp curve 31, the further down in the trailing edge of the rectified wave 30, the SCR switch 12 turns on, thereby generating a smaller current spike. The charge generated in this situation is considered a trickle charge and insufficient to force high temperatures in the batteries or overcharge the batteries. For the purposes of this invention, the timer is set by a 932 Hz oscillator to time out at 2.5 hours. During normal charging conditions, the LED circuit illuminates red when current is flowing through the batteries in excess of approximately 300 mA. The LED circuit 25 illuminates green when either the absolute temperature or time is reached.

The soft start circuit 21 ensures a smooth transition from a zero input voltage state to an active charging state. At initial connection with an AC voltage supply, the soft start circuit 21 sends a false high charging current signal to the input of the current sense amplifier circuit 15. The current sense amplifier circuit 15 believes this high current charging signal is coming off of the batteries 16 and therefore produces a high DC level 32 output. The soft start circuit 21 gradually sends less and less current to the current sense amplifier circuit 15, resulting in a current sense amplifier circuit output, sent to the triggering circuit 18, that is at a DC level that gradually lowers until intersection with the ramp curve 31. As a result of the initially high DC level 32, the triggering circuit 18 produces no control pulses or control pulses located very close to the zero cross of the trailing edge portion of the rectified curve 30. This creates a smooth transition to the fully active charging state.

Figure 5:
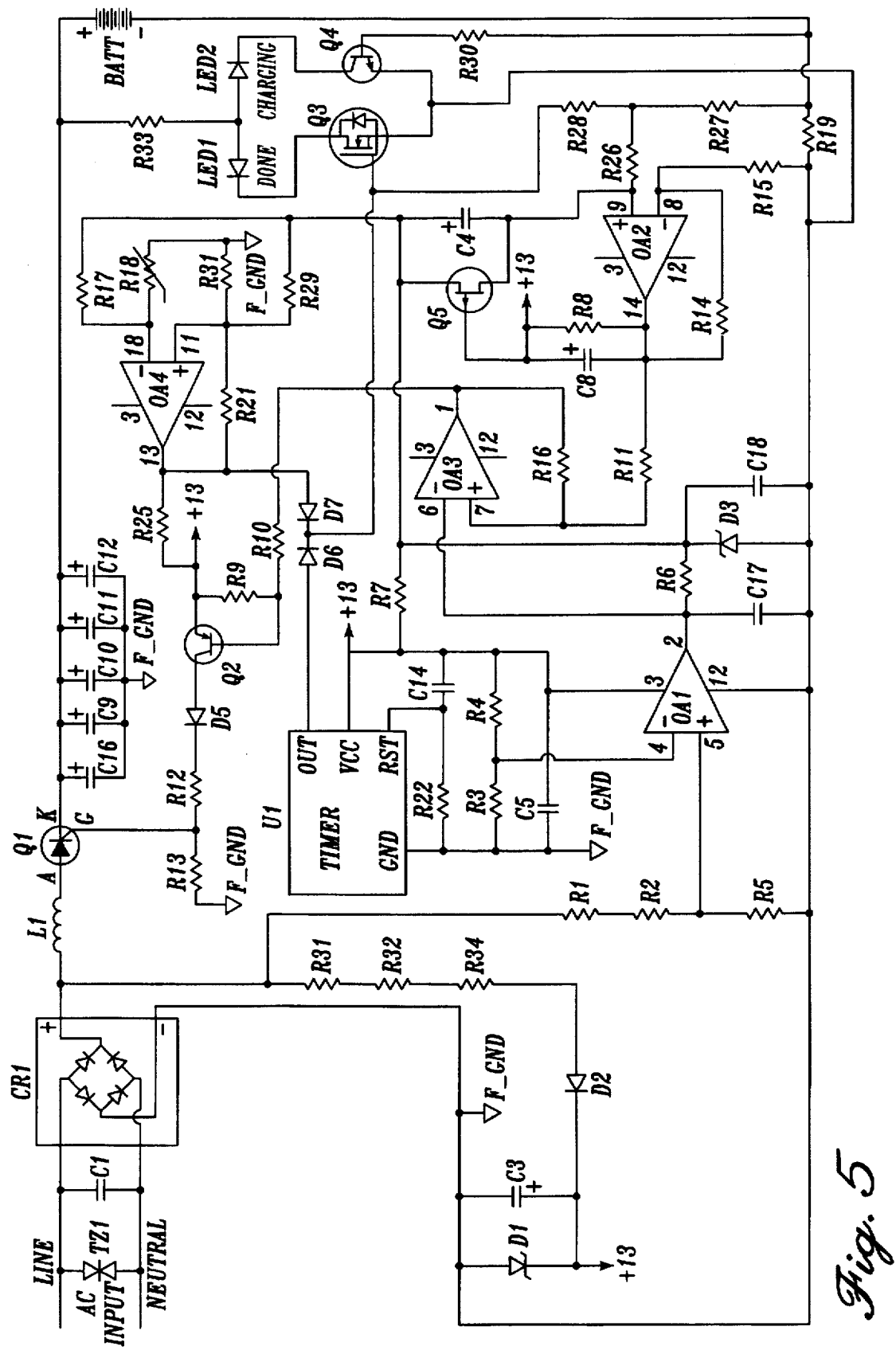
FIG. 5 is a circuit diagram of the charging circuit.

FIG. 5 is an illustration of the circuitry contained within each of the blocks of FIG. 2 and circuitry that provides other features that make the charging circuit of the present invention more durable. A transient suppresser TZ1 and capacitor C1 are connected in parallel between the input voltage supply and the rectifier CR1. The transient suppresser TZ1 conducts current in great quantity, if the input voltage is above a certain level. Essentially, the transient suppresser TZ1 is able to absorb large power spikes such as lightning. Capacitor C1, connected closer to the rectifier 10, filters noise from the input, suppressing some of the interference in the input line. When connected to a 120 volt, 60 Hz input line, rectifier CR1 converts the 60 Hz AC input into a fully rectified wave 30, as shown in FIG. 3. It will become apparent that this circuit can accommodate other input voltages and frequencies.

The input to the internal power regulator 17 is connected to a node at the positive output of the rectifier CR1. Resistors R31, R32, R34, and diode D2 are connected in series at the input of the internal power regulator 17 with R31 closest to CR1. Capacitor C3 is connected between the cathode of diode D2 and ground. A Zener diode D1 is also connected between the cathode of the diode D2 and ground. The output of the internal power regulator 17 at the cathode of diodes D1 and D2 is 13 volts and is used for running the other components within the charging circuit. The 13 volt power supply is separately connected through C5 to ground.

The positive output line of CR1 also branches to the ramp generator circuit 20. Within the ramp generator circuit 20, the line from the positive output of the CR1 is connected through R1 in series with R2 and R5 to ground. A line extending from the node between R2 and R5 is connected to the noninverting input pin 5 of the ramp generator's comparator OA1. Pin 3 of OA1 receives the 13 volt internal power generated by the internal power regulator 17. Pin 12 of OA1 is connected to ground. R4 is connected to the 13 volt supply through R3 to ground. A node between R4 and R3 is connected to the inverting input pin 4 of OA1. Capacitor C17 is connected at the output pin 2 of OA1 to ground. R6 is also connected to the output pin 2 of OA1 and is in series with Zener diode D3 to ground. The 13 volt power supply from the internal power regulator 17 is connected through R7 to the node between R6 and D3, producing a reference voltage of approximately 5.1 volts at the node between R6 and D3. The reference voltage is held stable by connection to ground through C18. The value and quality of C17 are critical because of the absolute requirement to produce a ramp curve 31, as shown in FIG. 3, that does not deviate from the desired slope or amplitude, the desired amplitude for this invention is 800 mV. This is important since deviations in the slope change the position at which the DC level 32 intersects the ramp curve 31, thereby triggering the SCR 12 to fire at incorrect positions along the rectified curve 30.

A third branch of the positive output line of the rectifier CR1 is connected through inductor L1 to the anode of the SCR switch Q1. L1 limits the rate of change of current passing through Q1. The line from the cathode of the SCR Q1 is connected to ground through capacitors C16, C9, C10, C11 and C12 connected in parallel. The cathode line is also connected to the positive lead of the batteries. A line connected to the negative lead of the batteries is connected through sense resistor R19 to ground. Resistor R27 is connected at the node between R19 and the negative lead of the batteries to an input of the current sense amplifier circuit 15 and output of the soft start circuit 21. In the soft start circuit 21, the reference voltage connects through C4 to the node between R26 and the input to the current sense amplifier circuit 15. Still within the soft start circuit 21, the source of a depletion mode field effect transistor Q5 is connected to the reference voltage. The gate of Q5 is connected to the 13 volt source from the internal power regulator 11 and the drain of Q5 is connected to the node between C4 and R26.

Within the current sense amplifier circuit 15, the node between R26 and C4 of the soft start circuit 21 is connected to the noninverting input pin 9 of comparator OA2 within the current sense amplifier circuit 15. The second input to the current sense amplifier circuit 15 originates from the ground side of R17 and is connected through R15 to the inverting input pin 8 of comparator OA2. Pin inputs 3 and 12 to OA2 are the same as that for OA1. Resistor R14 is connected at a node between R15 and the inverting input pin 8 of OA2 and the output pin 14 of OA2. C8 and R8 are connected in parallel to the output pin 14 of OA2 and the 13 volt power supply. R11 is connected to output pin 14 of OA2 and the output of the current sense amplifier circuit 15.

The output of current sense amplifier circuit 15 is connected to the input of the triggering circuit 18. Within the triggering circuit 18, the output from the current sense amplifier circuit 15 is connected to the noninverting input pin 7 of OA3. The inverting input of OA3 originates at the node between R6, C17 and the output of OA1 of the ramp generator circuit 14. Resistor R16 is connected between the noninverting pin 7 input and the output pin 1 of OA3. The output pin 1 of OA3 is connected through R10 in series with R9 to the internal 13 volt power supply from the internal power regulator 11. A node between R9 and R10 is connected to the base pin of bipolar PNP transistor Q2. Q2 acts as an inverter to the output signal of OA3. Q2's emitter is connected to the 13 volt power supply and the collector is connected through diode D5 at the anode in series with R12 and R13 to ground. The node between R12 and R13 is connected to the output of the triggering circuit 18. The output of the triggering circuit 18 is connected to the gate of the SCR Q1. K13 holds the gate of Q1 at a lower voltage than cathode therefore avoiding any inadvertent actions by Q1.

The absolute temperature circuit 23 has the reference voltage connected through R17 to the inverting input of OA4. Temperature variable resistor R18 is connected between the inverting input of OA4 and ground. R18 is a negative temperature coefficient thermistor, having a lower resistance when the ambient temperature is high and a higher resistance when the ambient temperature is cold. For the purposes of this invention, R18 has a resistance of 10K ohms at 25° C. The reference voltage is also connected through R29 in series with R31 to ground. A node between R29 and R31 is connected to the noninverting input pin 11 of OA4. R21 is connected between the noninverting input pin 11 and output pin 13 of OA4. R21 ensures that the trip for the absolute temperature going in both the rising and decreasing temperature direction is not the same value. The voltage at the inverting input pin 10 is the voltage at the actual temperature, while the voltage at the noninverting input pin 11 is the voltage defined by the absolute temperature cut off, 43° C. for this invention. OA4 lines 3 and 12 correspond to lines 3 and 12 of the other comparators. The output of OA4 is connected to the anode of D7 and also connected through R25 to the 13 volt power supply. The cathode of D7 is connected through R28 to the node between R26 and R27.

The absolute timing circuit 22 comprises an oscillator for determining a frequency and a chip for performing mathematical operations according to the determined frequency from the oscillator. The oscillator is set up to generate a frequency of 932 Hz. The 13 volt internal power source drives the timing chip and the oscillator. For the purposes of this invention, one of the outputs of the timer chip goes high at 2.5 hours. However, it can be appreciated to one of ordinary skill in the art that since the timing chip is a binary counter, it can be preprogrammed to go high at any fraction of the timed outputs. The output of the timer chip is connected to the anode of D6 and the cathode of D6 is connected to the node between the cathode of D7 and R28.

One input to the LED circuit is connected to the positive node of the batteries through R33 to a node connected to the anodes of green and red light emitting diodes LED1 and LED2. The cathode of the red light emitting diode LED2 is connected to the collector of an NPN bipolar transistor Q4. The base of Q4 is connected through R30 to the negative node of the batteries and the emitter of Q4 is connected to ground. LED2 remains lit while the charging circuit is in the standard charging mode. The cathode of green light emitting diode LED 1 is connected to the source of field effect transistor Q3. The drain of Q3 is connected to ground and the gate of Q3 is connected to the node between D6, D7 and R28. When either the absolute time circuit 22 or the absolute temperature circuit 23 trip to a higher level, Q3 disables the red LED2 and charges the green LED1.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An electrically powered device, including a removable rechargeable battery pack for powering said electrically powered device, said battery pack comprising:

at least one rechargeable battery; and a transformerless pulse charging circuit for receiving an input AC current and a current value from said at least one battery, generating a pulse charging current proportional to said received AC current and current value, and charging said at least one rechargeable battery by applying said pulse charging current to said at least one battery.

2. The electrically powered device of claim 1, wherein said charging circuit further comprises:

a rectifier circuit means for fully rectifying the received AC current;

a semiconductor switching means coupled to the rectifier circuit means for generating said pulse charging current from said rectified AC current and supplying said pulse charging current to said at least one battery;

a ramp generator circuit, coupled to said rectifier circuit means, for generating a linearly rising waveform beginning at each zero crossing of the rectified AC current;

a current sense amplifier circuit, coupled to the output terminal of said at least one battery, for measuring the average value of current through said at least one battery and generating a first DC level value proportional to said average charging value; and a triggering circuit for generating gate firing pulses for the semiconductor switching means according to said linearly rising waveform and said generated DC level value.

3. The electrically powered device of claim 2, wherein said charging circuit further comprises a number of capacitors in parallel between the semiconductor switch and said at least one battery for stabilizing said at least one battery impedance.

4. The electrically powered device of claim 2, further comprising a softstart circuit, between said at least one battery and said current sense amplifier circuit, for sending a decreasing current to said current sense amplifier circuit at initial reception of said input AC current thereby slowly increasing the pulse charge current to said at least one battery.

5. The electrically powered device of claim 2, further comprising an absolute temperature circuit, coupled to said current sense amplifier circuit, for sending current to said current sense amplifier circuit when a preset charging temperature is reached, forcing the current sense amplifier circuit to generate a second DC level greater than said first DC level, thereby pulse charging said at least one battery at a lower pulse charging level.

6. The electrically powered device of claim 2, further comprising an absolute time circuit, coupled to said current sense amplifier circuit, for sending current to said current sense amplifier circuit when a preset charging time is reached, forcing the current sense amplifier circuit to generate a second DC level greater than said first DC level, thereby pulse charging said at least one battery at a lower pulse charging level.

7. The electrically powered device of claim 1, wherein said at least one battery is a NiCd battery.

8. The electrically powered device of claim 1, wherein said at least one battery is a Nickel Metal Hydride battery.

9. A cellular phone, including a removable rechargeable battery pack, said battery pack comprising:

at least one rechargeable battery; and a transformerless pulse charging circuit for receiving an input AC current and a current value from said at least one battery, generating a pulse charging current proportional to said received AC current and current value, and charging said at least one rechargeable battery by applying said pulse charging current to said at least one battery.

10. The cellular phone of claim 9, wherein said recharging circuit comprises:

a rectifier circuit means for fully rectifying the received AC current;

a semiconductor switching means coupled to the rectifier circuit means for generating said pulse charging current from said rectified AC current and supplying said pulse charging current to said at least one battery;

a ramp generator circuit, coupled to said rectifier circuit means, for generating a linearly rising waveform beginning at each zero crossing of the rectified AC current;

a current sense amplifier circuit, coupled to the output terminal of said at least one battery, for measuring the average value of current through said at least one battery and generating a first DC level value proportional to said average charging value; and a triggering circuit for generating gate firing pulses for the semiconductor switching means according to said linearly rising waveform and said generated DC level value.

11. The cellular phone of claim 10, wherein said charging circuit further comprises a number of capacitors in parallel between the semiconductor switch and said at least one battery for stabilizing said at least one battery impedance.

12. The cellular phone of claim 10, further comprising a soft-start circuit, coupled between said output of said at least one battery and said current sense amplifier circuit, for sending a decreasing current to said current sense amplifier circuit at initial reception of said input AC current thereby slowly increasing the pulse charge current to said at least one battery.

13. The cellular phone of claim 10, further comprising an absolute temperature circuit, coupled to said current sense amplifier circuit, for sending current to said current sense amplifier circuit when a preset charging temperature is reached, forcing the current sense amplifier circuit to generate a second DC level greater than said first DC level, thereby pulse charging said at least one battery at a lower pulse charging level.

14. The cellular phone of claim 11, further comprising an absolute time circuit, coupled to said current sense amplifier circuit, for sending current to said current sense amplifier circuit when a preset charging time is reached, forcing the current sense amplifier circuit to generate a second DC level greater than said first DC level, thereby pulse charging said at least one battery at a lower pulse charging level.

15. The cellular phone of claim 9, wherein said at least one battery is a NiCd battery.

16. The cellular phone of claim 9, wherein said at least one battery is a Nickel Metal Hydride battery.

17. A cellular phone removable battery pack, comprising:

at least one rechargeable battery; and a transformerless pulse charging circuit for receiving an input AC current and a current value from said at least one battery, generating a pulse charging current proportional to said received AC current and current value, and charging said at least one rechargeable battery by applying said pulse charging current to said at least one battery.

18. The cellular phone removable battery pack of claim 17, wherein said charging circuit further comprises:

a rectifier circuit means for fully rectifying the received AC current;

a semiconductor switching means coupled to the rectifier circuit means for generating said pulse charging current from said rectified AC current and supplying said pulse charging current to said at least one battery;

a ramp generator circuit, coupled to said rectifier circuit means, for generating a linearly rising waveform beginning at each zero crossing of the rectified AC current;

a current sense amplifier circuit, coupled to the output terminal of said at least one battery, for measuring the average value of current through said at least one battery and generating a first DC level value proportional to said average charging value; and a triggering circuit for generating gate firing pulses for the semiconductor switching means according to said linearly rising waveform and said generated DC level value.

19. The battery pack of claim 18, wherein said charging circuit further comprises a number of capacitors in parallel between the semiconductor switch and said at least one battery for stabilizing said at least one battery impedance.

20. The battery pack of claim 18, further comprising a soft-start circuit, coupled between said output of said at least one battery and said current sense amplifier circuit, for sending a decreasing current to said current sense amplifier circuit at initial reception of said input AC current thereby slowly increasing the pulse charge current to said at least one battery.

21. The battery pack of claim 18, further comprising an absolute temperature circuit, coupled to said current sense amplifier circuit, for sending current to said current sense amplifier circuit when a preset charging temperature is reached, forcing the current sense amplifier circuit to generate a second DC level greater than said first DC level, thereby pulse charging said at least one battery at a lower pulse charging level.

22. The battery pack of claim 18, further comprising an absolute time circuit, coupled to said current sense amplifier circuit, for sending current to said current sense amplifier circuit when a preset charging time is reached, forcing the current sense amplifier circuit to generate a second DC level greater than said first DC level, thereby pulse charging said at least one battery at a lower pulse charging level.

23. The battery pack of claim 17, wherein said at least one battery is a NiCd battery.

24. The battery pack of claim 17, wherein said at least one battery is a Nickel Metal Hydride battery.

25. An electrically powered device, including a removable rechargeable battery pack for powering said electrically powered device, said battery pack comprising:

at least one rechargeable battery; and a transformerless pulse charging circuit for receiving an input AC current and a current value from said at least one battery, generating a pulse charging current proportional to said received AC current and current value, and charging said at least one rechargeable battery by applying said pulse charging current to said at least one battery, said pulse charging circuit further comprising:

a rectifier circuit means for fully rectifying the received AC current;

a semiconductor switching means coupled to the rectified circuit means for generating said pulse charging current from said rectified AC current and supplying said pulse charging current to said at least one battery;

a ramp generator circuit, coupled to said rectified circuit means, for generating a linearly rising waveform beginning at each zero crossing of the rectified AC current;

a current sense amplifier circuit, coupled to the output terminal of said at least one battery, for measuring the average value of current through said at least one battery and generating a first DC level value proportional to said average charging value; and a triggering circuit for generating gate firing pulses for the semiconductor switching means according to said linearly rising waveform and said generated DC level value.

26. A cellular phone, including a removable rechargeable battery pack, said battery pack comprising:

at least one rechargeable battery; and a transformerless pulse charging circuit for receiving an input AC current and a current value from said at least one battery, generating a pulse charging current proportional to said received AC current and current value, and charging said at least one rechargeable battery by applying said pulse charging current to said at least one battery, said pulse charging circuit comprising:

a rectifier circuit means for fully rectifying the received AC current;

a semiconductor switching means coupled to the rectifier circuit means for generating said pulse charging current from said rectified AC current and supplying said pulse charging current to said at least one battery;

a ramp generator circuit, coupled to said rectifier circuit means, for generating a linearly rising waveform beginning at each zero crossing of the rectified AC current;

a current sense amplifier circuit, coupled to the output terminal of said at least one battery, for measuring the average value of current through said at least one battery and generating a first DC level value proportional to said average charging value; and a triggering circuit for generating gate firing pulses for the semiconductor switching means according to said linearly rising waveform and said generated DC level value.

27. A cellular phone removable battery pack, comprising:

at least one rechargeable battery; and a transformerless pulse charging circuit for receiving an input AC current and a current value from said at least one battery, generating a pulse charging current proportional to said received AC current and current value, and charging said at least one rechargeable battery by applying said pulse charging current to said at least one battery, said pulse charging circuit further comprising:

a rectifier circuit means for fully rectifying the received AC current;

a semiconductor switching means coupled to the rectifier circuit means for generating said pulse charging current from said rectified AC current and supplying said pulse charging current to said at least one battery;

a ramp generator circuit, coupled to said rectifier circuit means, for generating a linearly rising waveform beginning at each zero crossing of the rectified AC current;

a current sense amplifier circuit, coupled to the output terminal of said at least one battery, for measuring the average value of current through said at least one battery and generating a first DC level value proportional to said average charging value; and a triggering circuit for generating gate firing pulses for the semiconductor switching means according to said linearly rising waveform and said generated DC level value.

* * * * *